United States Patent [19]

Fitzpatrick

[11] 4,040,521
[45] Aug. 9, 1977

[54] ELEMENTS FOR SUPPORTING WHEELS ABOVE GROUND AND DEVICE FOR CONNECTING THE ELEMENTS

[75] Inventor: Richard L. Fitzpatrick, Baker, La.

[73] Assignee: The Raymond Lee Organization, Inc., New York, N.Y. ; a part interest

[21] Appl. No.: 725,643

[22] Filed: Sept. 22, 1976

[51] Int. Cl.² ............................................. A47F 7/04
[52] U.S. Cl. ........................................ 211/24; 211/175
[58] Field of Search .................... 211/24, 23, 20, 21, 211/175, 189, 195, 200, 204; 248/352, 119 R

[56] References Cited

U.S. PATENT DOCUMENTS

| | | | |
|---|---|---|---|
| 580,655 | 4/1897 | Thew | 211/175 |
| 1,032,607 | 7/1912 | Ingalls | 248/352 |
| 1,131,477 | 3/1915 | Crofoot | 211/24 X |
| 1,343,526 | 6/1920 | Smith | 211/24 |
| 2,493,295 | 1/1950 | Kron | 248/352 |
| 2,746,703 | 5/1956 | Emery | 211/195 |
| 3,812,977 | 5/1974 | Glassman | 211/189 |

*Primary Examiner*—Ramon S. Britts

[57] ABSTRACT

Two flat, elongated support plates are arranged to form the shape of an X as viewed from the side. A base plate connects the bottom ends of the support plates together. A concave plate connects the top ends of the support plates together with the concave facing upwardly. A pair of these elements can be connected together by an elongated telescopic member that is secured at each end to a corresponding element by a hinge.

1 Claim, 4 Drawing Figures

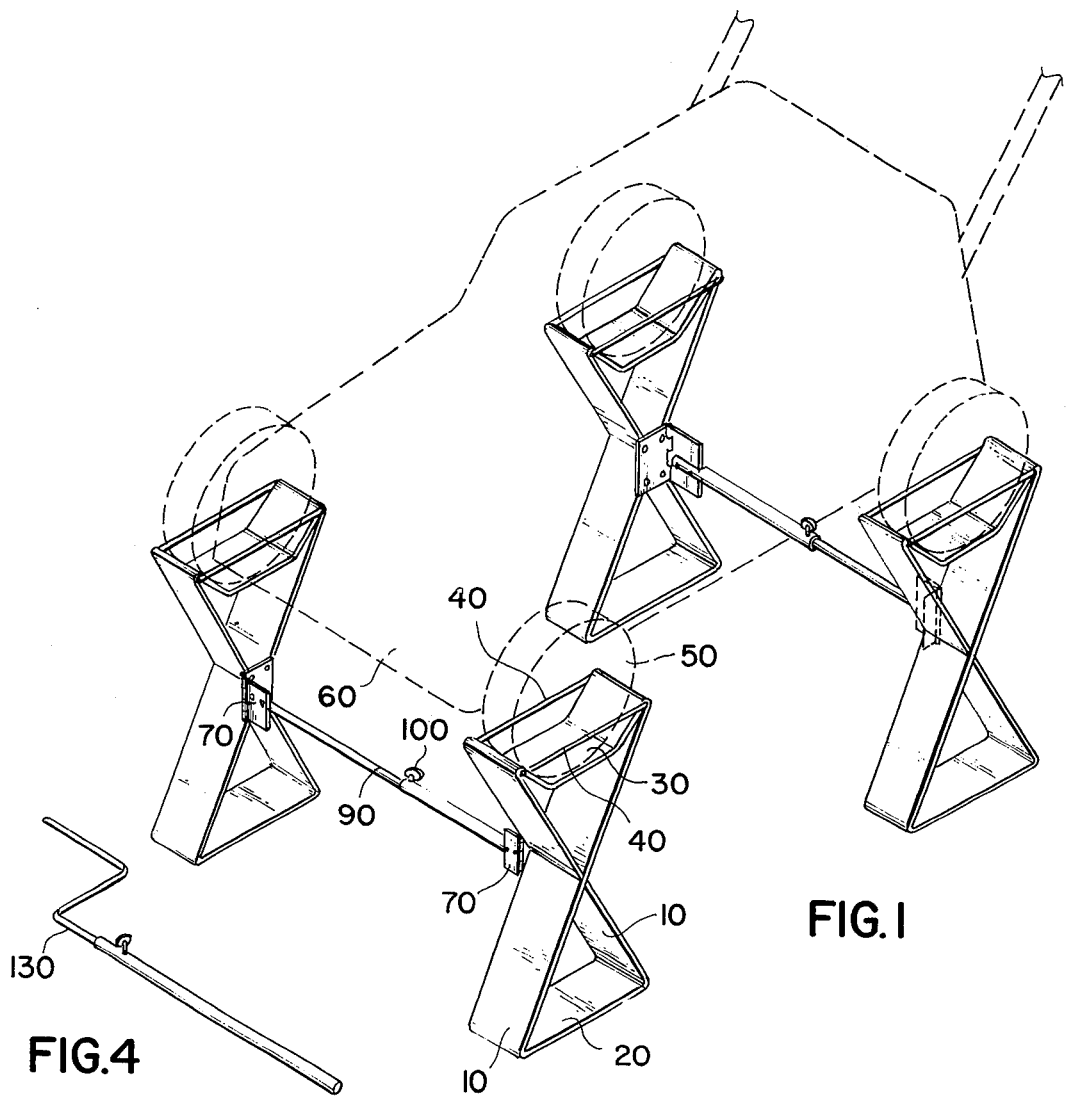
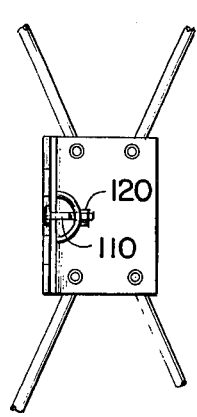 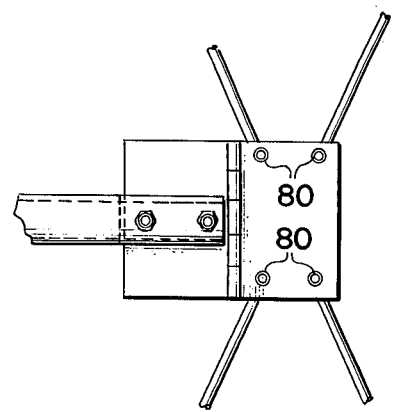

ELEMENTS FOR SUPPORTING WHEELS ABOVE GROUND AND DEVICE FOR CONNECTING THE ELEMENTS

SUMMARY OF THE INVENTION

This invention is designed to provide a device that will allow a homeowner to support a lawn mower above the ground in order to facilitate oil changing, sharpening of the blade, cleaning under the housing and other maintenance. In this device, the wheels of the lawnmower in question are placed in concave plates that are located at the tops of triangulated supporting structures. These structures may be connected together in pairs so as to increase stability. Hinges are used on these assemblies to facilitate storage.

BRIEF DESCRIPTION OF THE DRAWINGS

FIG. 1 shows the invention in use.
FIG. 2 shows a side view of one of the hinges in a partially folded state.
FIG. 3 shows a side view of one of the hinges in an unfolded state.
FIG. 4 shows an accessory for use with the invention.

DETAILED DESCRIPTION OF PREFERRED EMBODIMENTS

Two rectangular, elongated support plates 10 each have a central slot extending transversely inwardly from the center of one of the elongated sides to the centerline of the plate. As shown, the two plates are assembled with their slots engaging each other to form an X as viewed from the side. The bottom ends of the plates are connected together by horizontal base plate 20. The top ends of the plates are connected together by a concave plate 30, which has two downwardly sloping end pieces that meet a horizontal center piece, creating a concave that faces upwardly. In addition, two elongated bars 40 connect corresponding corners of the top ends of the plates together. A triangulated element is thus formed, which can support a wheel 50 of a lawn mower 60 in the well between the bars and the concave plate. A leaf hinge 70 is connected to each of these elements by studs 80 attached to plates 10. Between the movable leaves of the hinges is attached an elongated two piece telescopic member 90. This member has a thumbscrew 100 that allows the length of the member to be set by being tightened against the inner tubular piece of the member; the thumbscrew is set into the outer piece. As can be seen, the tubular pieces are cut longitudinally and attached to the hinges by nuts 110 and bolts 120.

In some lawnmowers, one of the wheels is offset from a position at the corner of a rectangle. To accommodate this type of mower construction, an inner tubular piece can be bent with two right angles as shown at 130.

I claim:
1. A device for supporting two horizontally spaced vertical wheels at the same vertical level above ground, said device comprising:
    first and second like elements, each element having a central slot extending transversely inwardly from the center of one of the elongated sides to the centerline of the plate, the plates engaging each other with their slots so as to form a vertically elongated X when viewed from the side, a horizontal base plate connecting the bottom ends of the support plates together, and a concave plate connecting the top ends of the support plates together with the concave facing upwardly and disposed mainly below the top ends, said elements being spaced apart with the sides of the support plates and one element being aligned with the sides of the support plates of the other element;
    like first and second vertical leaf hinges, each hinge being secured flat to the junction of the sides of the corresponding one of the two elements; and
    an elongated horizontal telescopic member connecting the second leaves of the two hinges together, each end of the member being cut longitudinally and being secured flat to the corresponding second leaf.

* * * * *